United States Patent
Fukuda et al.

(10) Patent No.: US 11,458,847 B2
(45) Date of Patent: Oct. 4, 2022

(54) ARTICLE TRANSFERRING DEVICE

(71) Applicant: Murata Machinery, Ltd., Kyoto (JP)

(72) Inventors: Isao Fukuda, Kyoto (JP); Kazuhiro Ishikawa, Inuyama (JP); Kenji Kadoguchi, Inuyama (JP); Masataka Hayashi, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 663 days.

(21) Appl. No.: 16/480,074

(22) PCT Filed: Dec. 14, 2017

(86) PCT No.: PCT/JP2017/044996
§ 371 (c)(1),
(2) Date: Jul. 23, 2019

(87) PCT Pub. No.: WO2018/139098
PCT Pub. Date: Aug. 2, 2018

(65) Prior Publication Data
US 2019/0375302 A1    Dec. 12, 2019

(30) Foreign Application Priority Data
Jan. 27, 2017 (JP) .............................. JP2017-013603

(51) Int. Cl.
*B60L 13/03*      (2006.01)
*B65G 23/23*      (2006.01)
(Continued)

(52) U.S. Cl.
CPC .............. *B60L 13/03* (2013.01); *B65G 23/23* (2013.01); *B60L 2200/26* (2013.01);
(Continued)

(58) Field of Classification Search
CPC ....... B60L 13/03; B65G 23/23; B65G 17/345; B65G 47/71; B65G 2201/02; B65G 54/02; B65G 47/46
(Continued)

(56) References Cited

U.S. PATENT DOCUMENTS 5,588,520 A * 12/1996 Affaticati ............... B65G 47/31
                                                        198/502.2
5,609,209 A *  3/1997 Shu ........................ C09K 8/512
                                                        507/903
(Continued)

FOREIGN PATENT DOCUMENTS

JP          57-137218 A      8/1982
JP          02-086514 A      3/1990
(Continued)

*Primary Examiner* — James R Bidwell
(74) *Attorney, Agent, or Firm* — DLA Piper LLP (US)

(57) ABSTRACT

An article transferring device that transfers articles includes: a traveling rail; primary-side stators; a power source; a first transporting carriage and a second transporting carriage each of which includes a secondary-side movable element and transports an article by the secondary-side movable element receiving a magnetic action from the primary-side stators. Each of the first transporting carriage and the second transporting carriage is caused to travel so as to be stopped or change a traveling speed individually by a ground primary-side linear motor system including the primary-side stators and the secondary-side movable element, and further includes a transferring unit that transfers the article in an intersecting direction intersecting with the predetermined path by receiving force from the power source.

14 Claims, 13 Drawing Sheets

(51) Int. Cl.
*B65G 47/46* (2006.01)
*B65G 54/02* (2006.01)

(52) U.S. Cl.
CPC .............. *B65G 47/46* (2013.01); *B65G 54/02* (2013.01); *B65G 2201/02* (2013.01)

(58) Field of Classification Search
USPC .......................................... 198/370.06, 371.2
See application file for complete search history.

(56) References Cited

U.S. PATENT DOCUMENTS

| | | | | |
|---|---|---|---|---|
| 5,701,992 | A * | 12/1997 | Enomoto | B65G 17/345 198/370.1 |
| 9,452,893 | B1 * | 9/2016 | Fujihara | B65G 47/46 |
| 2004/0134752 | A1 * | 7/2004 | Miller | B65G 17/345 198/370.06 |
| 2010/0089274 | A1 * | 4/2010 | Austin | B65G 17/345 105/238.1 |
| 2017/0349383 | A1 * | 12/2017 | Myers | B65G 47/71 |
| 2019/0344967 | A1 * | 11/2019 | Tomoda | B60L 13/03 |

FOREIGN PATENT DOCUMENTS

| | | | | |
|---|---|---|---|---|
| JP | 05-39114 | A | 2/1993 | |
| JP | 05-328535 | A | 12/1993 | |
| JP | 06-76134 | B2 | 9/1994 | |
| JP | 06-245328 | A | 9/1994 | |
| JP | 6032418 | A | 11/2016 | |
| | B2/2014-133609 | | | |
| WO | 2020/021792 | * | 1/2020 | ............. B65G 54/02 |

* cited by examiner

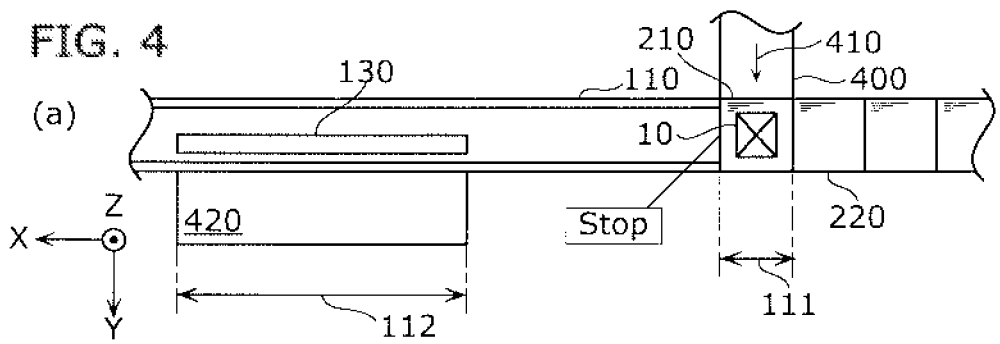
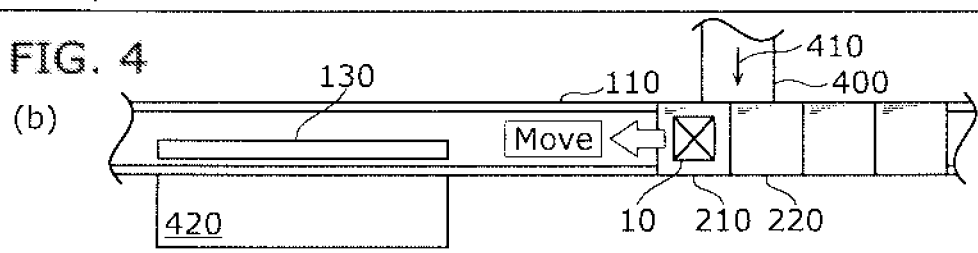
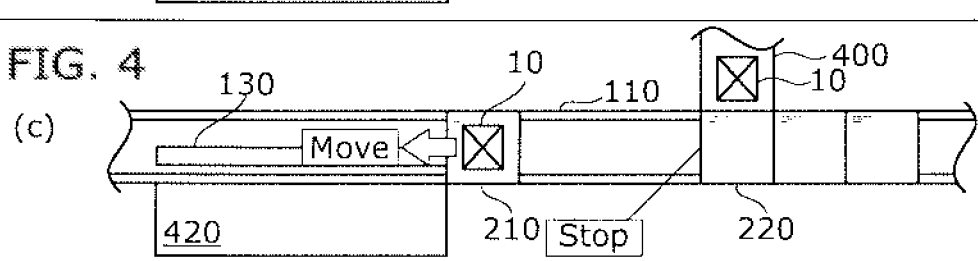
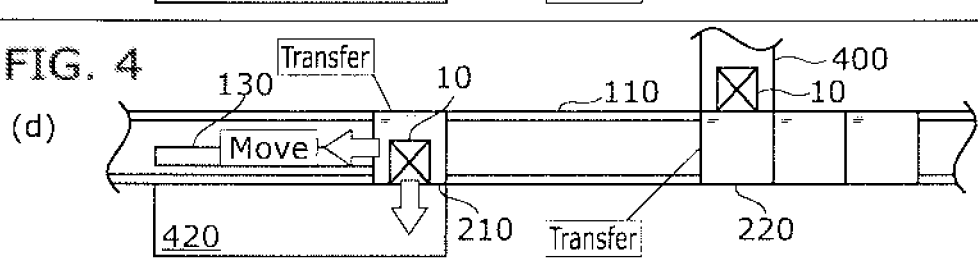
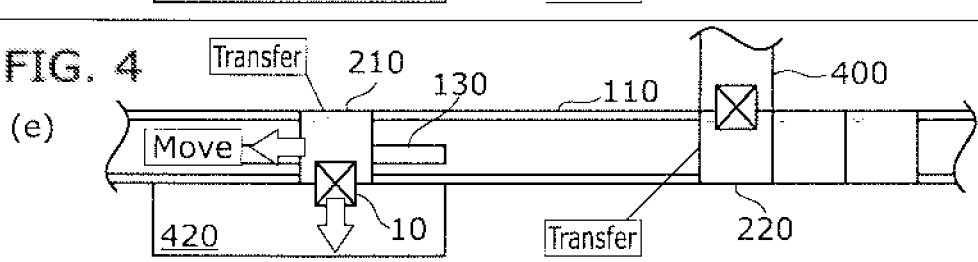
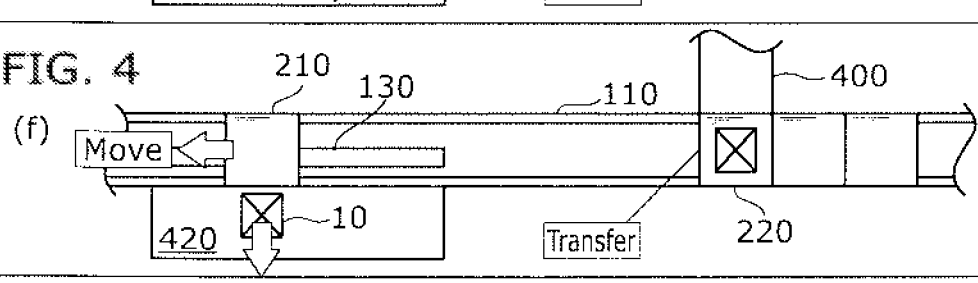

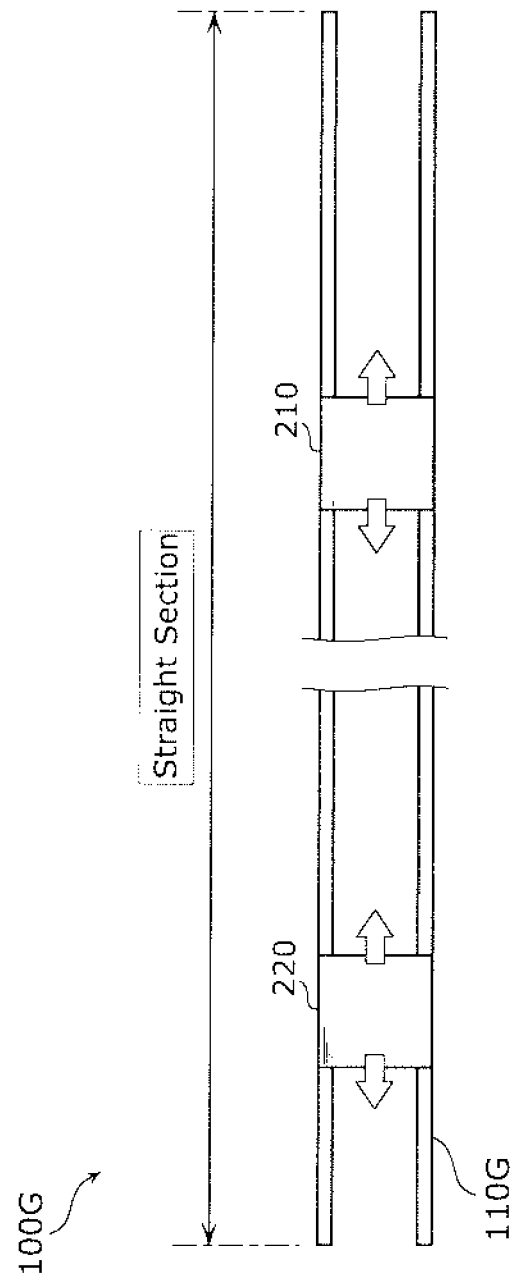

ARTICLE TRANSFERRING DEVICE

TECHNICAL FIELD

This disclosure relates to an article transferring device that transports and transfers articles by utilizing a ground primary-side linear motor.

BACKGROUND

There has been disclosed a transporting device that transports articles by causing pallets (transporting carriages) to travel separately by utilizing a ground primary-side linear motor in Japanese Patent Unexamined Application Publication No. 05-328535.

However, according to JP '535, transferring articles to and from another device or the like has not been performed efficiently or satisfactorily.

It could therefore be helpful to provide an article transferring device capable of transporting articles onto a predetermined path in which the article transferring device can transfer the articles satisfactorily and efficiently to and from another device and location at the side of the predetermined path.

SUMMARY

We thus provide:

An article transferring device that transfers articles, the article transferring device including: a traveling rail disposed along a predetermined path; primary-side stators disposed along the predetermined path; a first transporting carriage and a second transporting carriage each of which includes a secondary-side movable element and transports an article by traveling on the traveling rail by the secondary-side movable element receiving a magnetic action from the primary-side stators; and a power source disposed on the predetermined path, wherein each of the first transporting carriage and the second transporting carriage is caused to travel to be stopped or change a traveling speed individually by a ground primary-side linear motor system including the primary-side stators and the secondary-side movable element, and further includes a transferring unit that transfers the article in an intersecting direction intersecting with the predetermined path by receiving force from the power source.

According to this article transferring device, since the operations of the first transporting carriage and the second transporting carriage are controlled separately, it is possible to move each transporting carriage to a transferring location of each article according to the timing of transferring the article. Therefore, in an article transferring device capable of transporting articles onto a predetermined path, it is possible to transfer the articles satisfactorily and efficiently to and from another device and location at the side of the predetermined path.

It is also possible that the article transferring device further includes a controller that controls an operation of the ground primary-side linear motor system, wherein the controller causes one of the first transporting carriage and the second transporting carriage to move while causing another of the first transporting carriage and the second transporting carriage to stop.

Therefore, it is possible to stop either one of the first transporting carriage and the second transporting carriage according to the timing of transferring an article. This makes it possible to transfer articles satisfactorily and efficiently to and from another device and location at the side of the predetermined path.

It is further possible that the traveling rail includes a first transferring section arranged along a direction intersecting with a direction of arranging a first transporting path of a first transporting device that transports the article, the first transferring section being a section in which the article is transferred to and from the first transporting device, and the controller causes the transferring unit to transfer the article to and from the first transporting device in a state in which each of the first transporting carriage and the second transporting carriage is stopped in the first transferring section.

Therefore, according to the timing of transporting an article by the first transporting device, it is possible to cause one of the first transporting carriage and the second transporting carriage that corresponds to the timing of transporting, to stop in the first transferring section. Therefore, it is possible to transfer articles satisfactorily and efficiently to and from the first transporting device.

It is still further possible that the traveling rail includes a second transferring section running in parallel with a second transporting path of a second transporting device which transports the article, the second transferring section being a section in which the article is transferred to and from the second transporting device, and that the controller causes the transferring unit to transfer the article in a state in which each of the first transporting carriage and the second transporting carriage is caused to travel at a traveling speed in synchronous with a transporting speed of the second transporting device in the second transferring section.

Since transferring an article is performed in a state in which each transporting carriage is caused to travel at a speed synchronous with the transporting speed of the second transporting device that transports articles on the second transporting path running in parallel with the second transferring section, it is possible to sufficiently perform transferring of articles to and from the second transporting device.

It is still further possible that the controller causes the first transporting carriage and the second transporting carriage to travel synchronously with each other.

Therefore, it is possible to efficiently move the first transporting carriage and the second transporting carriage.

It is still further possible that the transferring unit includes: a secondary-side rotator that rotates by a rotary shaft extending in a traveling direction of the first transporting carriage or the second transporting carriage; and a transferring conveyor driven in the intersecting direction by the secondary-side rotator, the power source comprises the primary-side stators each having a substantially C-shaped cross section, the primary-side stators covering a part of a region where the secondary-side rotator included in each of the first transporting carriage and the second transporting carriage passes when each of the first transporting carriage and the second transporting carriage travels, and the secondary-side rotator is rotated by receiving magnetic force due to a magnetic action from the primary-side stator of the power source to drive the transferring conveyor.

The power source is disposed without being in contact with the first transporting carriage and the second transporting carriage, and applies force to the transferring unit by magnetic action. In this way, since neither power for traveling nor power for transferring is mounted on the first transporting carriage and the second transporting carriage, and both of the transporting carriages are based on magnetic action, it is possible to simplify the configuration of the first transporting carriage and the second transporting carriage.

It is still further possible that the traveling rail includes an endless path having a straight section and an arc section, and the article transferring device further comprises: a rotation mechanism rotated to cause one of the first transporting carriage and the second transporting carriage to move on the arc section; and a motor that rotates the rotation mechanism.

Therefore, it is easy to cause each of the first transporting carriage and the second transporting carriage to travel even in the arc section.

It is still further possible that the endless path of the traveling rail includes a pair of straight sections facing each other in a vertical direction, the pair of straight sections including an upper straight section and a lower straight section, and each of the first transporting carriage and the second transporting carriage is caused to travel in the arc section by gravity to each of the first transporting carriage and the second transporting carriage, the arc section being connected from the upper straight section to the lower straight section.

Therefore, there is no need to mount a power source relating to the traveling of the transporting carriage in the arc section connecting from the upper straight section to the lower straight section. This makes it possible to simplify the configuration of the traveling rail.

It is still further possible that the controller that controls operation of the ground primary-side linear motor system causes the first transporting carriage or the second transporting carriage to decelerate by controlling the primary-side stators disposed in the lower straight section.

Therefore, it is possible to inhibit that control of traveling is disabled when the first transporting carriage and the second transporting carriage are each caused to travel by gravity. That is, it is possible to appropriately control the traveling of the first transporting carriage and the second transporting carriage.

It is still further possible that the controller causes the first transporting carriage and the second transporting carriage to stay in the lower straight section.

Therefore, it is possible to provide the first transporting carriage or the second transporting carriage at a small time lag when it becomes necessary to transport an article.

It is still further possible that the primary-side stators disposed in the upper straight section are arranged more densely than the primary-side stators that are disposed in the lower straight section.

Therefore, it is possible to more accurately control the traveling of the first transporting carriage and the second transporting carriage in the upper straight section in which transferring of articles is performed.

It is still further possible that the article transferring device further includes: a transporting conveyor disposed to be aligned in a direction of the predetermined path with the traveling rail in which the primary-side stators are disposed in the predetermined path, the transporting conveyor transporting the first transporting carriage and the second transporting carriage.

Therefore, in a section in which it is not necessary to change the traveling speed separately for each of the first transporting carriage and the second transporting carriage, it is possible to make them move at a constant speed on the predetermined path by the transporting conveyor. That is, it is possible to simplify the configuration of a section in which the traveling speed does not need to be changed separately.

It is still further possible that the predetermined path is an endless path having a straight section and an arc section in a plan view, and the transporting conveyor is disposed along the arc section.

It is still further possible that the predetermined path is an endless path having a straight section and an arc section in a plan view, and that the traveling rail and the transporting conveyor are disposed to be aligned in the straight section in a direction in which the straight section extends, the primary-side stators being disposed along the traveling rail.

The article transferring device, which is an article transferring device capable of transporting articles onto a predetermined path, can transfer articles satisfactorily and efficiently to and from another device and location at the side of the predetermined path.

BRIEF DESCRIPTION OF THE DRAWINGS

FIGS. 4(a)-4(f) are diagrams explaining a use example of the article transferring device.

FIG. 13 is a schematic diagram explaining a configuration of an article transferring device according to another example.

REFERENCE SIGNS LIST

Figure 1:
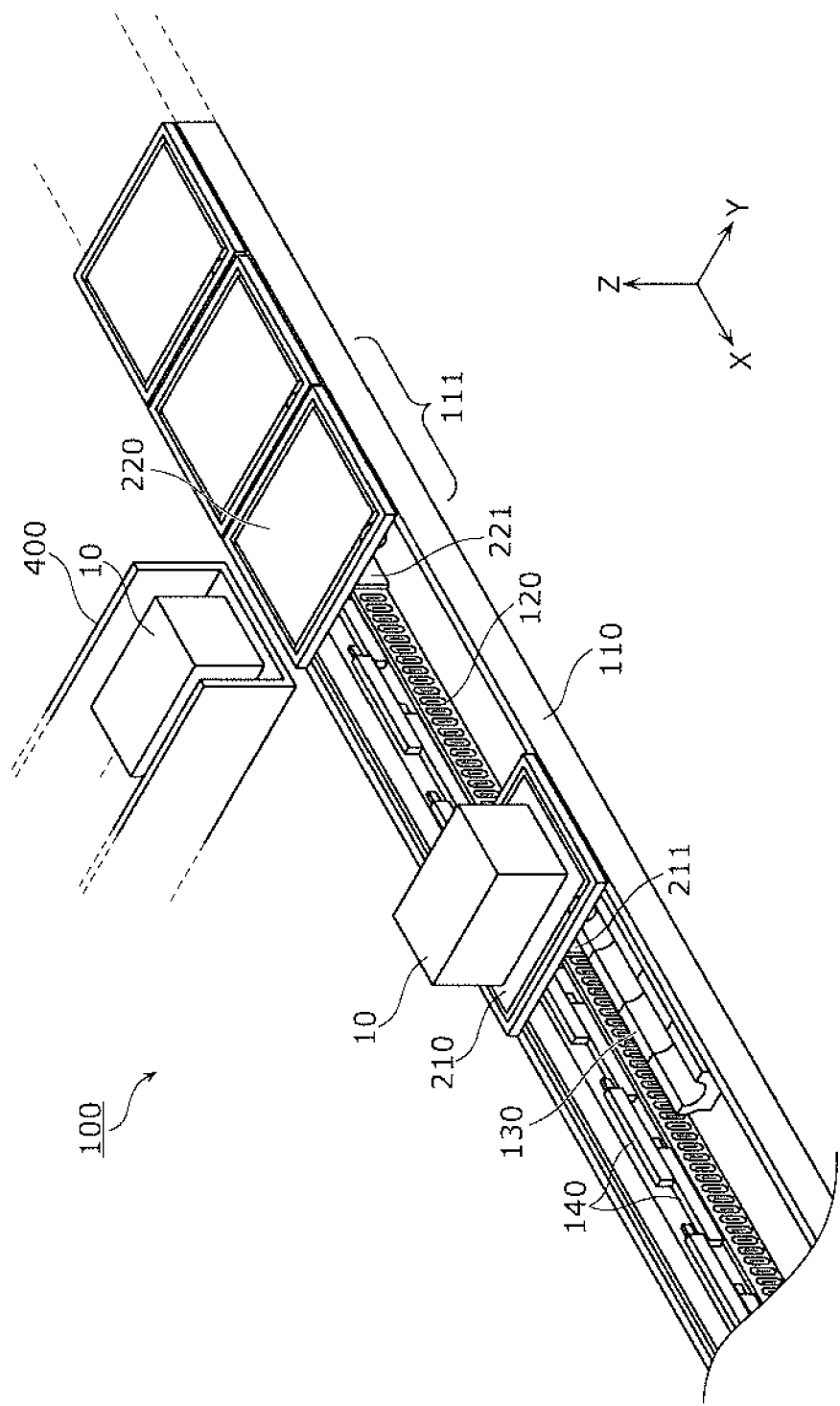
FIG. 1 is a perspective diagram explaining a configuration of an article transferring device in an example.

10 Article
100, 100A to 100G Article transferring device
110, 110A to 110G Traveling rail
111 First transferring section
112, 112E Second transferring section
113 Upper straight section
114, 116 Arc section
114a, 116a Inner rail
114b, 116b Outer rail
115 Lower straight section
120, 120F Primary-side stators
130 Power source 131 Primary-side stator
140 Position sensor
150 Rotation mechanism
151 Protruding portion
160 Driving unit
210, 210F First transporting carriage
211, 211F Secondary-side movable element
212, 212F Transferring unit
213, 213F Secondary-side rotator
214, 214F Transferring conveyor
215, 215F Belt
216 Detectable portion
217, 217F Frame
218, 218F Roller
219F Supporting member
220, 220F Second transporting carriage
221 Secondary-side movable element
222 Transferring unit
223, 223F Secondary-side rotator
226 Detectable portion
300 Controller
400 First transporting device
410 First transporting path
420 Sorting chute
430 Second transporting device
440 Second transporting path

DETAILED DESCRIPTION

Hereinafter, examples of an article transferring device are described in greater detail with reference to the accompanying Drawings. Furthermore, each figure in the Drawings is a schematic diagram and is not necessarily an exact diagram.

It should be noted that all the configurations described below are specific examples. Numerical values, shapes, materials, constituent elements, arrangement positions and the connection configuration of the constituent elements, steps, the order of the steps and the like described in the following configurations are merely examples, and not intended to limit this disclosure. Our devices are characterized by the appended claims. Therefore, among the constituent elements in the following examples, constituent elements that are not described in independent claims that show the most generic concept of our devices are described as elements constituting more desirable configurations.

EXAMPLE 1

First, referring to FIGS. 1 and 2, an outline of an article transferring device 100 in an examples will be described.

FIG. 1 is a perspective diagram explaining a configuration of the article transferring device in the example. FIG. 2 is a schematic diagram of the article transferring device in the example seen from a traveling direction of a transporting carriage.

Figure 2:
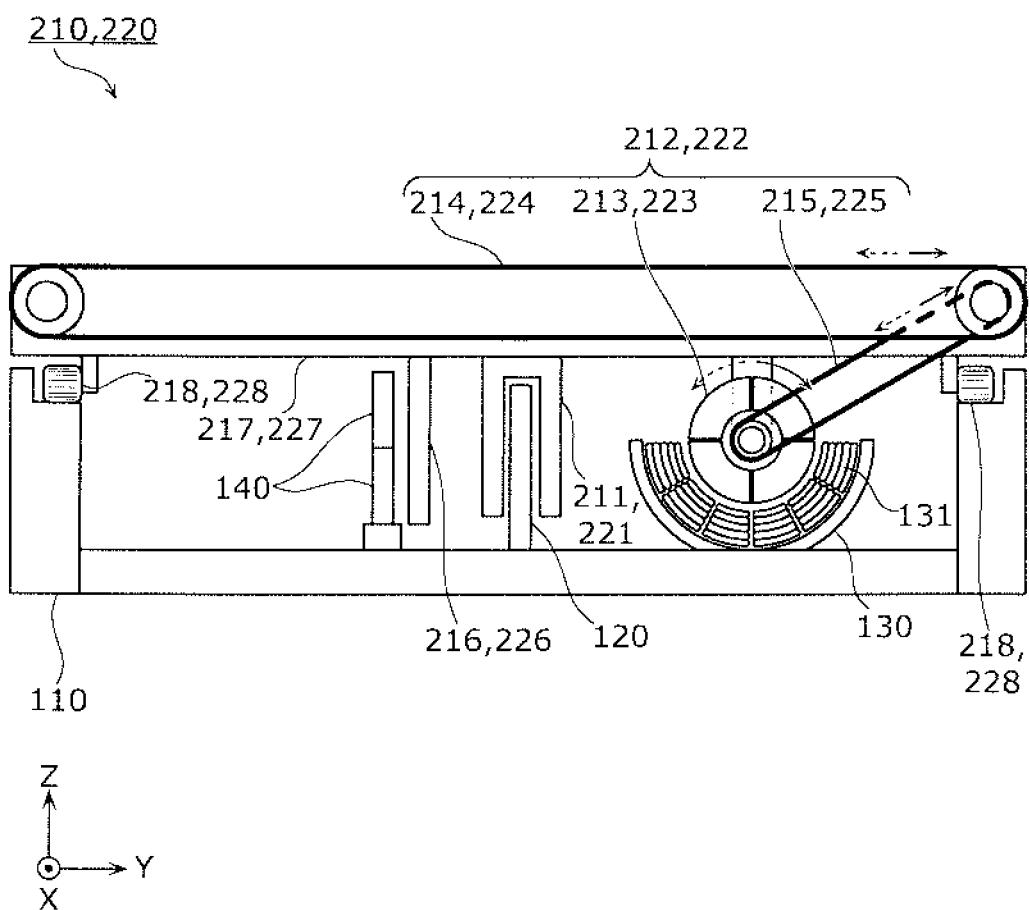
FIG. 2 is a schematic diagram of the article transferring device in the example seen from a traveling direction of a transporting carriage.

The article transferring device 100 includes, as shown in FIGS. 1 and 2, a traveling rail 110, primary-side stators 120, a power source 130, a first transporting carriage 210, and a second transporting carriage 220. Further, the article transferring device 100 may include a position sensor 140.

The traveling rail 110 is a member disposed along the predetermined path (an X-axis direction in FIGS. 1 and 2). Specifically, the traveling rail 110, which is formed of two long-sized members each having a shape along the predetermined path and aligned in a direction orthogonal to the predetermined path, is made of, for example, metal such as aluminum and an aluminum alloy. The traveling rail 110 may be made of resin. In this example, as shown in FIG. 1, the traveling rail 110 includes a first transferring section 111 arranged along a direction intersecting with a direction of arranging a first transporting path 410 of a first transporting device 400 that transports an article 10. The first transferring section 111 is a section where the article 10 is transferred to and from the first transporting device 400.

The primary-side stators 120 are disposed along the predetermined path. Specifically, each of the primary-side stators 120 is constituted of a long plate-like substrate elongated along the predetermined path and a corresponding one of a plurality of coils disposed to be aligned in the longitudinal direction of the substrate. That is, substantially, the plurality of coils function as the primary-side stators 120. The plurality of coils constituting the primary-side stators 120 each generate magnetic field independently by being controlled separately by a controller not shown. Thus, by being separately controlled by the controller, the primary-side stators 120 provide magnetic action to a secondary-side movable element 211 and a secondary-side movable element 221 provided in the first transporting carriage 210 and the second transporting carriage 220, respectively, and thereby applies force in the X-axis direction to move the first transporting carriage 210 and the second transporting carriage 220 on the traveling rail 110. In this example, it is sufficient that the article transferring device 100 includes at least two transporting carriages of the first transporting carriage 210 and the second transporting carriage 220 and, of course, an article transferring device including three or more transporting carriages is included in the scope of this disclosure. In this example, it is preferable that all of the three or more transporting carriages have the same functional configuration.

The power source 130, which is disposed on the predetermined path, applies force to a transferring unit 212 included in the first transporting carriage 210 and the second transporting carriage 220, thereby activating the transferring unit 212.

The position sensor 140 is a sensor that detects the position of each of the first transporting carriage 210 and the second transporting carriage 220. The position sensor 140 is, for example, a magnetic sensor, and detects the position of a permanent magnet as a detectable portion provided on each of the first transporting carriage 210 and the second transporting carriage 220. The position sensor 140 may not be a magnetic sensor, and may be a sensor using a laser beam, an ultrasonic wave or the like, or may be a sensor using an image captured by a camera.

The position sensor 140 is disposed on and along the predetermined path. Specifically, the position sensor 140 is disposed over the section in which the primary-side stators 120 are disposed. Thereby, by controlling, according to the respective positions of the first transporting carriage 210 and the second transporting carriage 220 detected by the position sensor 140, one of the primary-side stators 120 corresponding to the concerned position, the article transferring device 100 can control the traveling action of each of the first transporting carriage 210 and the second transporting carriage 220.

Referring to FIG. 2, the first transporting carriage 210 will be specifically described.

The first transporting carriage 210 is a transporting carriage having the secondary-side movable element 211, and transports an article by traveling on the traveling rail 110 by the secondary-side movable element 211 receiving magnetic action from the primary-side stators 120. The first transporting carriage 210 includes the transferring unit 212, a detectable portion 216, a frame 217 serving as a base, and traveling rollers 218 provided on the frame 217, in addition to the secondary-side movable element 211.

The secondary-side movable element 211 is constituted of, for example, a plurality of permanent magnets. The plurality of permanent magnets constituting the secondary-side movable element 211 are disposed to be aligned in the traveling direction of the first transporting carriage 210. The secondary-side movable element 211 is disposed to protrude downwardly from the frame 217 to face both sides in the Y-axis direction of the primary-side stators 120 in a state in which the first transporting carriage 210 is disposed on the traveling rail 110. That is, the secondary-side movable element 211 has a configuration in which a plurality of permanent magnets are arranged in two rows in the X-axis direction on both sides in the Y-axis direction of the primary-side stators 120. The one row of plural permanent magnets is disposed such that an N pole and an S pole are alternately oriented toward the side facing the primary-side stators 120. The secondary-side movable element 211 may be constituted of one row of permanent magnets without being limited to the two rows of permanent magnets. Moreover, the secondary-side movable element 211 may be constituted of plural rows of permanent magnets aligned in the traveling direction. The first transporting carriage 210 travels such that it can be individually stopped or change a speed (accelerated/decelerated) by a ground primary-side linear motor system constituted of the primary-side stators 120 disposed on the predetermined path and the secondary-side movable element 211 included in the first transporting carriage 210.

The transferring unit 212 transfers an article in an intersecting direction (Y-axis direction) intersecting with the predetermined path by receiving force from the power source 130. Although, in this example the transferring unit 212 transfers an article in the Y-axis direction, the transferring direction is not limited to the Y-axis direction and may be a direction not strictly orthogonal to the predetermined path provided that it is a direction intersecting with the predetermined path (the traveling direction of the first transporting carriage 210). For example, the transferring unit 212 may be arranged along a direction intersecting with the predetermined path (the traveling direction of the first transporting carriage 210) at 45 degrees.

Specifically, the transferring unit 212 includes a secondary-side rotator 213, a transferring conveyor 214, and a belt 215. The secondary-side rotator 213 is rotated about a rotary shaft extending along the traveling direction of the first transporting carriage 210. The secondary-side rotator 213 rotates by receiving magnetic force by the magnetic action from a primary-side stator 131 of the power source 130, and drives the transferring conveyor 214. The secondary-side rotator 213 is supported by a supporting member disposed to protrude downwardly from the frame 217 to rotate below the frame 217.

Referring to FIG. 2, details of the power source 130 will be described.

The power source 130 is constituted of the primary-side stators 131 each having a substantially C-shaped cross section. The primary-side stators 131 cover a substantially cylindrical region through which the secondary-side rotator 213 included in the first transporting carriage 210 passes when the first transporting carriage 210 travels. In the power source 130, a plurality of primary-side stators 131 are disposed on the path to be aligned along the path. The power source 130 applies a magnetic force by magnetic action to the secondary-side rotator 213 included in the first transporting carriage 210 by causing the primary-side stators 131 to generate a predetermined magnetic field. The power source 130 is disposed in a section where the transferring unit 212 of the first transporting carriage 210 is to be driven on the predetermined path, and when the first transporting carriage 210 passes through the section and the article 10 from the outside is transferred or the article 10 is transferred to the outside, drives the transferring unit 212 of the first transporting carriage 210 by being controlled by the controller.

The transferring conveyor 214 is driven in the intersecting direction via the belt 215 by the secondary-side rotator 213. The transferring conveyor 214 is, for example, a belt conveyor driven in the Y-axis direction, and disposed on an upper surface of the first transporting carriage 210. That is, the transferring conveyor 214 is a mounting surface of the article 10 on the first transporting carriage 210, and driven in the Y-axis direction to transfer the article 10 from the outside in the Y-axis direction to the upper surface of the first transporting carriage 210 (that is, the upper surface of the transferring conveyor 214), and to transfer the article 10 placed on the upper surface of the first transporting carriage 210 from the concerned upper surface to the outside in the Y-axis direction. The transferring conveyor 214 may be, without being limited to a belt conveyor, a roller conveyor.

The belt 215 is a power transmission belt that connects the rotary shaft of the secondary-side rotator 213 and the rotary shaft to drive the transferring conveyor 214, and transfers rotation from the rotary shaft of the secondary-side rotator 213 to the rotary shaft to drive the transferring conveyor 214. The belt 215 is, for example, a rubber belt. The belt 215 may be, without being limited to a rubber belt, a chain.

The detectable portion 216 is, for example, a permanent magnet and a member to be detected by the position sensor 140. The detectable portion 216 may not be a permanent magnet and, when the position sensor 140 is a sensor using a laser beam, an ultrasonic wave, or an image captured by a camera, may be a carriage body itself of the first transporting carriage 210.

The second transporting carriage 220 includes a secondary-side movable element 221, a transferring unit 222, a detectable portion 226, a frame 227 serving as a base, and traveling rollers 228 provided on the frame 227.

The secondary-side movable element 221 has the same configuration as that of the secondary-side movable element 211.

The transferring unit 222 has the same configuration as that of the transferring unit 212. That is, the secondary-side rotator 223, the transferring conveyor 224, and the belt 225 included in the transferring unit 222, respectively, have the same configurations as those of the secondary-side rotator 213, the transferring conveyor 214, and the belt 215.

Further, the detectable portion 226, the frame 227, and the roller 228 respectively have the same configurations as those of the detectable portion 216, the frame 217, and the roller 218.

Figure 3:
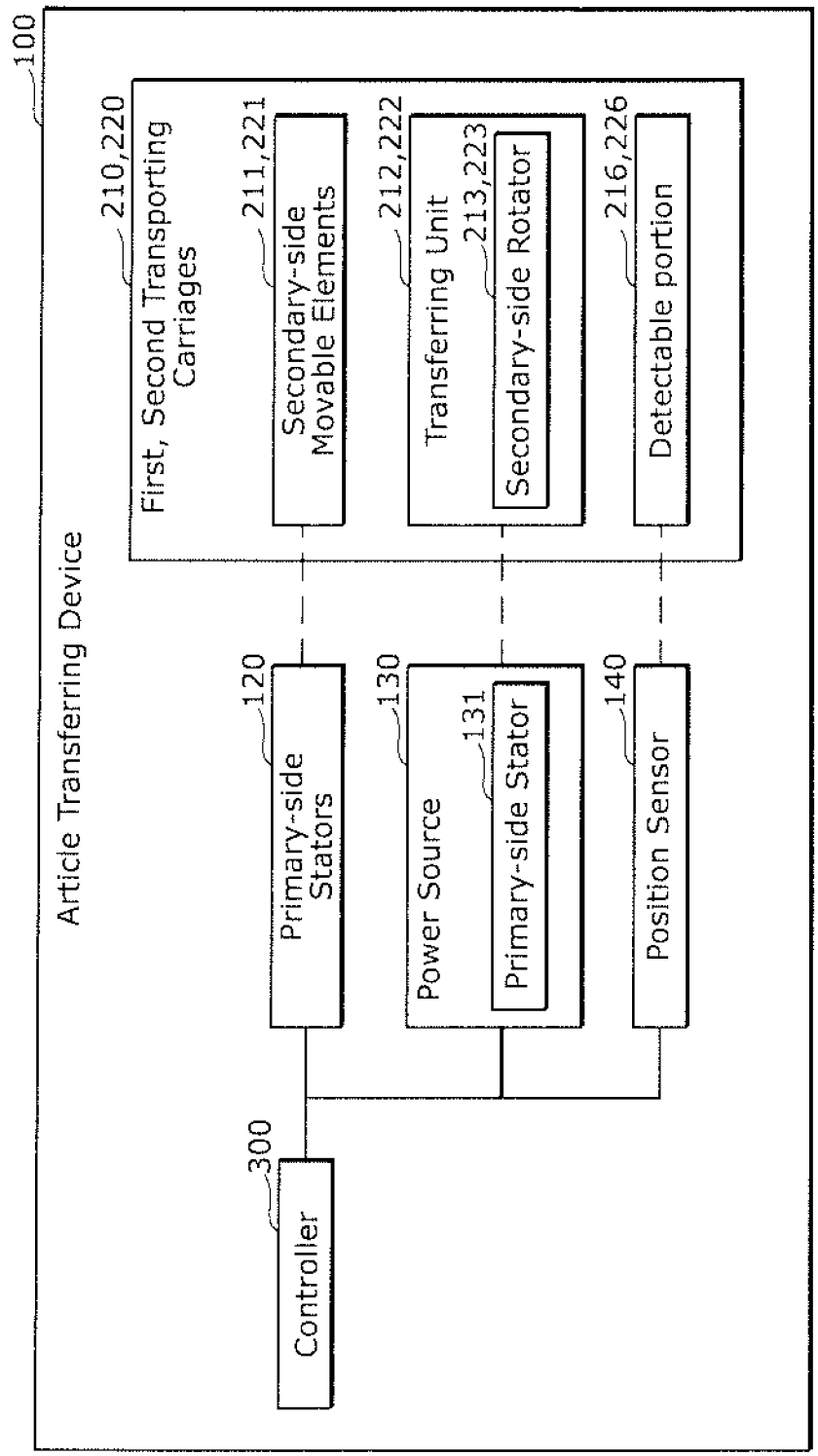
FIG. 3 is a block diagram illustrating functional configuration of the article transferring device in the example.

FIG. 3 is a block diagram illustrating functional configuration of the article transferring device in the example.

The article transferring device 100 includes a controller 300, the primary-side stators 120, the power source 130, the position sensor 140, the first transporting carriage 210, and the second transporting carriage 220.

Since the primary-side stators 120, the power source 130, the position sensor 140, and the first transporting carriage 210 (the second transporting carriage 220) have been described using FIGS. 1 and 2, description thereof will be omitted. That is, only the controller 300 will be described here. The second transporting carriage 220 also functions in the same manner as the first transporting carriage 210.

The controller 300 controls operation of the ground primary-side linear motor system made up of the primary-side stators 120 and the secondary-side movable element 211 of the first transporting carriage 210. The controller 300 can control the first transporting carriage 210 and the second transporting carriage 220 independently by controlling the primary-side stators 120 and, specifically, can perform control to move one of the first transporting carriage 210 and the second transporting carriage 220 while the other thereof is stopped. For example, having each of the first transporting carriage 210 and the second transporting carriage 220 stopped at the first transferring section 111, the controller 300 causes the transferring units 212 and 222 to transfer articles to and from the first transporting device 400.

Moreover, the controller 300 may control the primary-side stators 120 thereby causing the first transporting carriage 210 and the second transporting carriage 220 to travel synchronously with each other.

The controller 300 is constituted of, for example, a processor executing a predetermined program, and a memory that stores the predetermined program. Moreover, the controller 300 may also be constituted of a special-purpose circuit.

Next, a use example of the article transferring device 100 will be described.

FIG. 4 is a diagram explaining an example of the article transferring device.

In the example of FIG. 4, the traveling rail 110 of the article transferring device 100 includes the first transferring section 111 arranged along a direction intersecting with a direction of arranging the first transporting path 410 of the first transporting device 400, and receives the article 10 from the first transporting device 400. In addition, the traveling rail 110 includes a second transferring section 112 in which a sorting chute 420 is disposed at a position rearward of the first transferring section 111 in the traveling direction and outside the predetermined path. The power source 130 is disposed over each of the first transferring section 111 and the second transferring section 112. As a result of this, the controller 300 can drive the transferring unit 212, 222 of each transporting carriage 210, 220 in the first transferring section 111 and the second transferring section 112.

As shown in FIG. 4(a), by controlling the primary-side stators 120, the controller 300 causes each transporting carriage 210, 220 to stop in the first transferring section 111.

Next, as shown in FIG. 4(b), by controlling the primary-side stators 120, the controller 300 causes the first transporting carriage 210 that has received the article 10, to travel and move.

Next, as shown in FIG. 4(c), by controlling the primary-side stators 120, the controller 300 causes the first transporting carriage 210 to keep on moving. In addition, by controlling the primary-side stators 120, the controller 300 causes the next second transporting carriage 220 to stop in the first transferring section 111 according to the detection result of the position sensor 140, and to stand by until receiving the article 10 from the first transporting device 400.

Next, as shown in FIGS. 4(d) to (f) by controlling the power source 130 according to detection result of the position sensor 140, the controller 300 drives the transferring unit 212 of the first transporting carriage 210 to transfer the article 10 to the sorting chute 420 disposed outside the traveling rail 110. At the same time, the controller 300 drives the transferring unit 222 of the second transporting carriage 220 to transfer the article 10 from the first transporting device 400 onto the transferring unit 222.

According to the article transferring device 100 relating to this example, since operation of the first transporting carriage 210 and the second transporting carriage 220 are separately controlled, it is possible to move each transporting carriage 210, 220 to a transferring location of the article 10 according to the timing of transferring each article 10. Therefore, in the article transferring device 100 capable of transporting the article 10 onto the predetermined path, it is possible to transfer articles at satisfactory efficiency to and from the first transporting device 400 and the sorting chute 420 and the like at the side of the predetermined path.

The article transferring device 100 further includes a controller 300 that controls an operation of the ground primary-side linear motor system. The controller 300 causes one of the first transporting carriage 210 and the second transporting carriage 220 to move while causing the other of the first transporting carriage 210 and the second transporting carriage 220 to stop.

Therefore, it is possible to stop either one of the first transporting carriage 210 and the second transporting carriage 220 according to the timing of transferring the article 10. This makes it possible to transfer the article 10 satisfactorily and efficiently to and from the first transporting device 400 and the sorting chute 420 at the side of the predetermined path.

Furthermore, in the article transferring device 100, the traveling rail 110 includes a first transferring section 111 arranged along a direction intersecting with a direction of arranging a first transporting path 410 of a first transporting device 400 that transports the article 10, the first transferring section 111 being a section in which the article 10 is transferred to and from the first transporting device 400. The controller 300 causes the transferring unit 212, 222 to transfer the article 10 to and from the first transporting device 400 in a state in which each of the first transporting carriage 210 and the second transporting carriage 220 is stopped in the first transferring section 111.

For this reason, according to the timing of transporting the article 10 by the first transporting device 400, it is possible to cause one of the first transporting carriage 210 and the second transporting carriage 220 corresponding to the timing of transporting to stop in the first transferring section 111. Therefore, it is possible to transfer articles at satisfactory efficiency to and from the first transporting device 400.

Furthermore, in the article transferring device 100, the controller 300 causes the first transporting carriage 210 and the second transporting carriage 220 to travel synchronously with each other. For this reason, it is possible to efficiently move the first transporting carriage 210 and the second transporting carriage 220.

Furthermore, in the article transferring device 100, the transferring unit 212, 222 includes: a secondary-side rotator 213 that rotates by a rotary shaft extending in a traveling direction of the first transporting carriage 210 or the second transporting carriage 220; and a transferring conveyor 214 driven in the intersecting direction by the secondary-side rotator 213. The power source 130 comprises primary-side stators 131 each having a substantially C-shape cross section. The primary-side stators 131 cover a part of a region where the secondary-side rotator 213, 223 included in each of the first transporting carriage 210 and the second transporting carriage passes 220 when each of the first transporting carriage 210 and the second transporting carriage 220 travels. The secondary-side rotator 213 is rotated by receiving magnetic force due to a magnetic action from the primary-side stator 131 of the power source 130 to drive the transferring conveyor 214.

Thus, the power source 130 is disposed without being in contact with the first transporting carriage 210 and the second transporting carriage 220, and applies force to the transferring unit 212, 222 by magnetic action. In this way, since the first transporting carriage 210 and the second transporting carriage 220 have neither power to travel nor power to transfer mounted thereon, and are both based on magnetic action, it is possible to simplify the configuration of the first transporting carriage 210 and the second transporting carriage 220.

EXAMPLE 2

Next, Example 2 will be described.

Figure 5:
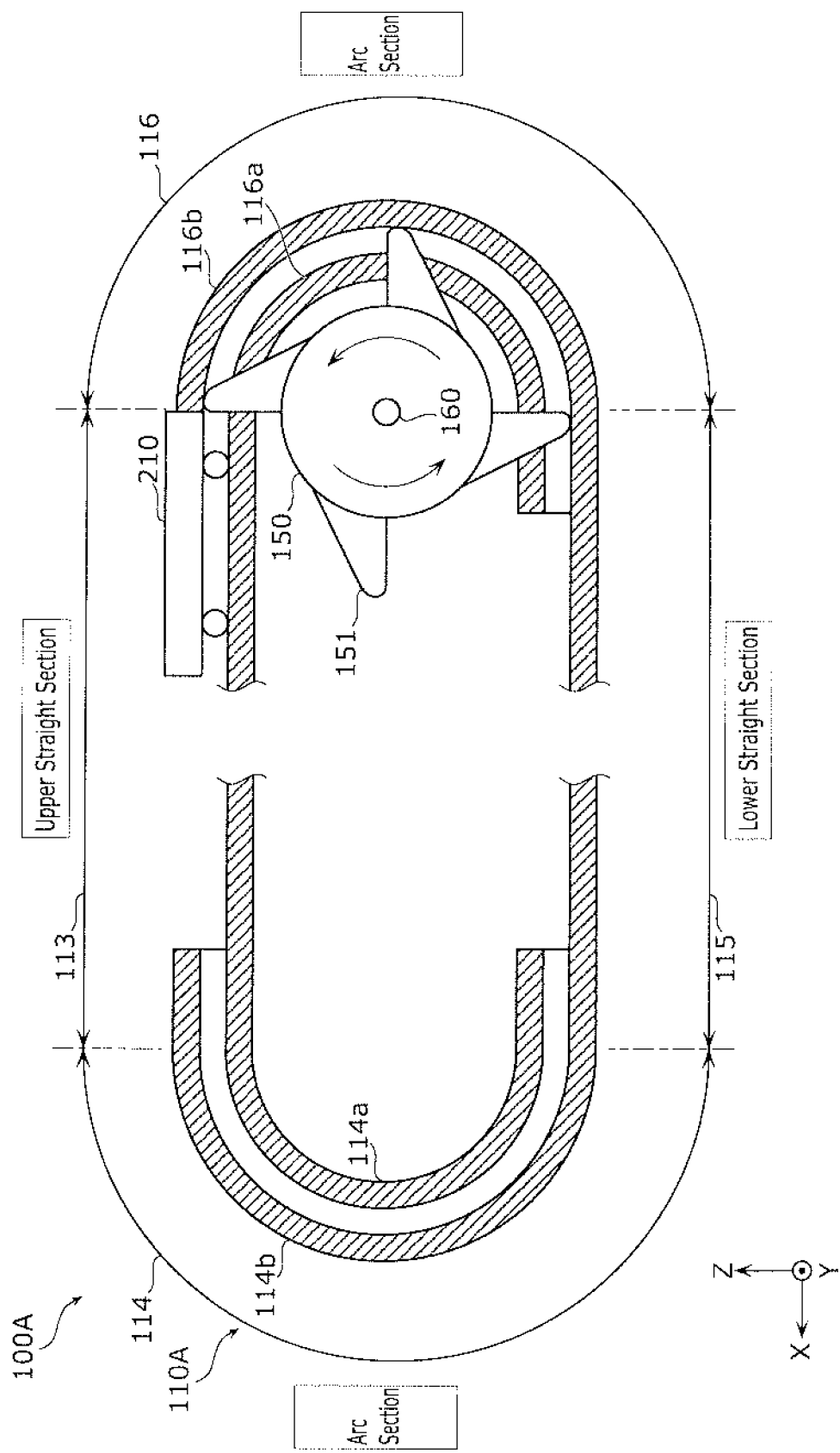
FIG. 5 is a schematic diagram explaining a configuration of an article transferring device according to Example 2.

FIG. 5 is a schematic diagram explaining a configuration of an article transferring device 100A according to Example 2.

As shown in FIG. 5, in the article transferring device 100A, a traveling rail 110A has straight sections 113, 115 and arc sections 114, 116 constituting an endless path. Specifically, the traveling rail 110A includes a pair of straight sections 113, 115 facing each other in a vertical direction. The arc section 114, which is a section in which each transporting carriage 210, 220 travels from the upper straight section 113 toward the lower straight section 115, connects a rear end of the upper straight section 113 with a front end of the lower straight section 115 in the traveling direction of each transporting carriage 210, 220. The arc section 116, which is a section in which each transporting carriage 210, 220 travels from the lower straight section 115 toward the upper straight section 113, connects a rear end of the lower straight section 115 with a front end of the upper straight section 113 in the traveling direction of each transporting carriage 210, 220. That is, the traveling rail 110A constitutes a path having an elliptic shape (oval shape) as seen from the horizontal direction.

Moreover, each of the arc sections 114, 116 includes inner rails 114a, 116a and outer rails 114b, 116b disposed at the inside and outside of each arc section 114, 116 with the rollers 218, 228 of each transporting carriage 210, 220 being interposed there between. This allows each transporting carriage 210, 220 to travel without being deviated from the arc sections 114, 116 even when the traveling direction is inclined from the horizontal direction.

Figure 6:
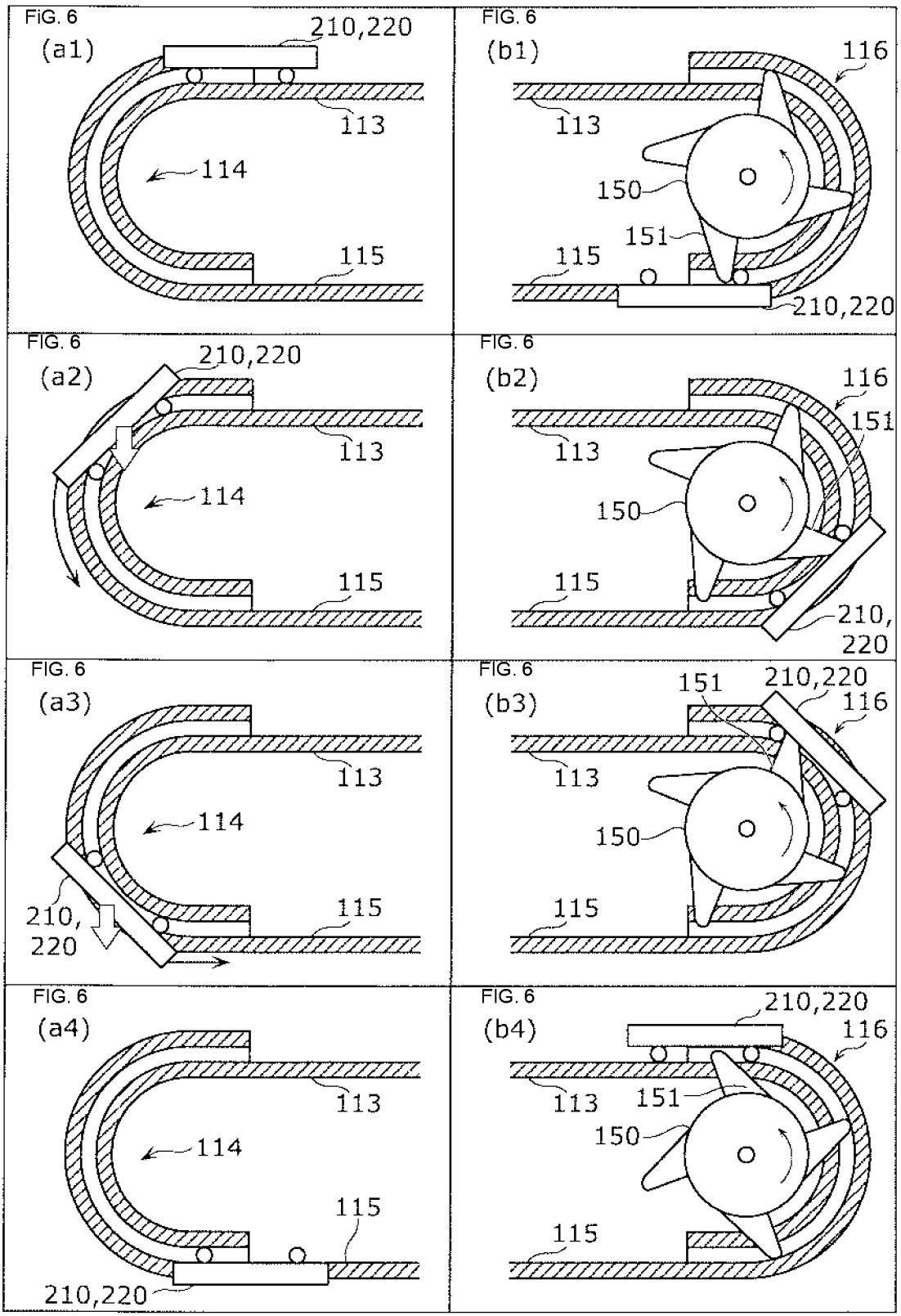
FIGS. 6(a1)-6(b4) are diagrams explaining each transporting carriage that travels in each arc section according to Example 2.

FIG. 6 is a diagram explaining each transporting carriage that travels in each arc section according to Example 2. Moreover, although not shown, it is supposed that primary-side stators 120 are disposed in the upper straight section 113 and the lower straight section 115. Therefore, each transporting carriage 210, 220 is allowed to travel in the upper straight section 113 and the lower straight section 115 by the traveling scheme described in Example 1.

As shown in FIGS. 6(a1) to 9a4), each transporting carriage 210, 220 is caused to travel by gravity to the transporting carriage 210, 220 in the arc section 114 which connects from the upper straight section 113 to the lower straight section 115. Therefore, there is no need of mounting a power source relating to the traveling of each transporting carriage 210, 220 in the arc section 114 connecting from the upper straight section 113 to the lower straight section 115. This makes it possible to simplify the configuration of the traveling rail 110A.

Specifically, as shown in FIG. 6(a1), by controlling the primary-side stators 120 in the upper straight section 113, the controller 300 causes each transporting carriage 210, 220 to travel and enter into the arc section 114.

Next, as shown in FIGS. 6(a2) and (a3), each transporting carriage 210, 220 is caused to travel in the arc section 114 by gravity acting on each transporting carriage 210, 220.

Then, as shown in FIG. 6(a4), each transporting carriage 210, 220 travels on the lower straight section 115 with its upside down compared to when traveling on the upper straight section 113.

In this occasion, the controller 300 may cause each transporting carriage 210, 220 to decelerate by controlling the primary-side stators 120 disposed in the lower straight section 115. Therefore, it is possible to inhibit that the control of traveling is disabled when each transporting carriage 210, 220 is caused to travel by gravity. That is, it is possible to appropriately control the traveling of each transporting carriage 210, 220.

Moreover, the controller 300 may cause each transporting carriage 210, 220 to stay in the lower straight section 115. Therefore, when it becomes necessary to transport the article 10, it is possible to provide each transporting carriage 210, 220 to a position where the article is to be received (for example, the first transferring section 111 in Example 1) at a small time lag. That is, in this example, the first transferring section 111 that transfers the article 10 may be disposed in the upper straight section 113. Moreover, the second transferring section 112 may also be disposed in the upper straight section 113.

Moreover, the article transferring device 100A further includes a rotation mechanism 150 and a driving unit 160 in the article transferring device 100 according to Example 1.

The rotation mechanism 150 is rotated to move the first transporting carriage 210 or the second transporting carriage 220 on the arc section 116. Specifically, the rotation mechanism 150 is configured such that protruding portions 151 that pass through on the path of the arc section 116 rotate with the center of a circle as a rotation axis, in which a part of the circle corresponds to the arc of the arc section 116. As a result of this, for example, the roller 218, 228 on the front side in the traveling direction of each transporting carriage 210, 220 is guided by the protruding portions 151 to travel on the arc section 116, and thereby each transporting carriage 210, 220 moves on the arc section 116. The rotation mechanism 150 rotates in a direction (left rotating direction in FIG. 5) in which each transporting carriage 210, 220 moves upward in the arc section 116.

The driving unit 160 causes the rotation mechanism 150 to rotate in a predetermined rotating direction (left rotating direction in FIG. 5). The driving unit 160 is, for example, a motor.

In this way, by driving the rotation mechanism 150 in a predetermined rotating direction, it becomes easy to move each transporting carriage 210, 220 from the lower straight section 115 toward the upper straight section 113 on the arc section 116.

For example, as shown in FIGS. 6(b1) to (b4), each transporting carriage 210, 220 is caused to move on the arc section 116 connecting from the lower straight section 115 to the upper straight section 113 as the rotation mechanism 150 rotates.

Specifically, as shown in FIG. 6(b1), by controlling the primary-side stators 120 in the lower straight section 115, the controller 300 causes each transporting carriage 210, 220 to travel and enter into the arc section 116.

Next, as shown in FIGS. 6(b2) and (b3), each transporting carriage 210, 220 is guided in the left rotating direction on the path of the arc section 116 by the protruding portions 151 of the rotation mechanism 150 to travel in the arc section 116.

Then, as shown in FIG. 6(b4), each transporting carriage 210, 220 reaches the upper straight section 113, and again becomes ready to travel by magnetic action from the primary-side stators 120 in the upper straight section 113.

It is also possible that the primary-side stators 120 disposed in the upper straight section 113 are arranged more densely than the primary-side stators 120 disposed in the lower straight section. Therefore, it is possible to more accurately control the travel of each transporting carriage 210, 220 in the upper straight section 113 which transfers the article 10.

Variant 1 of Example 2

Figure 7:
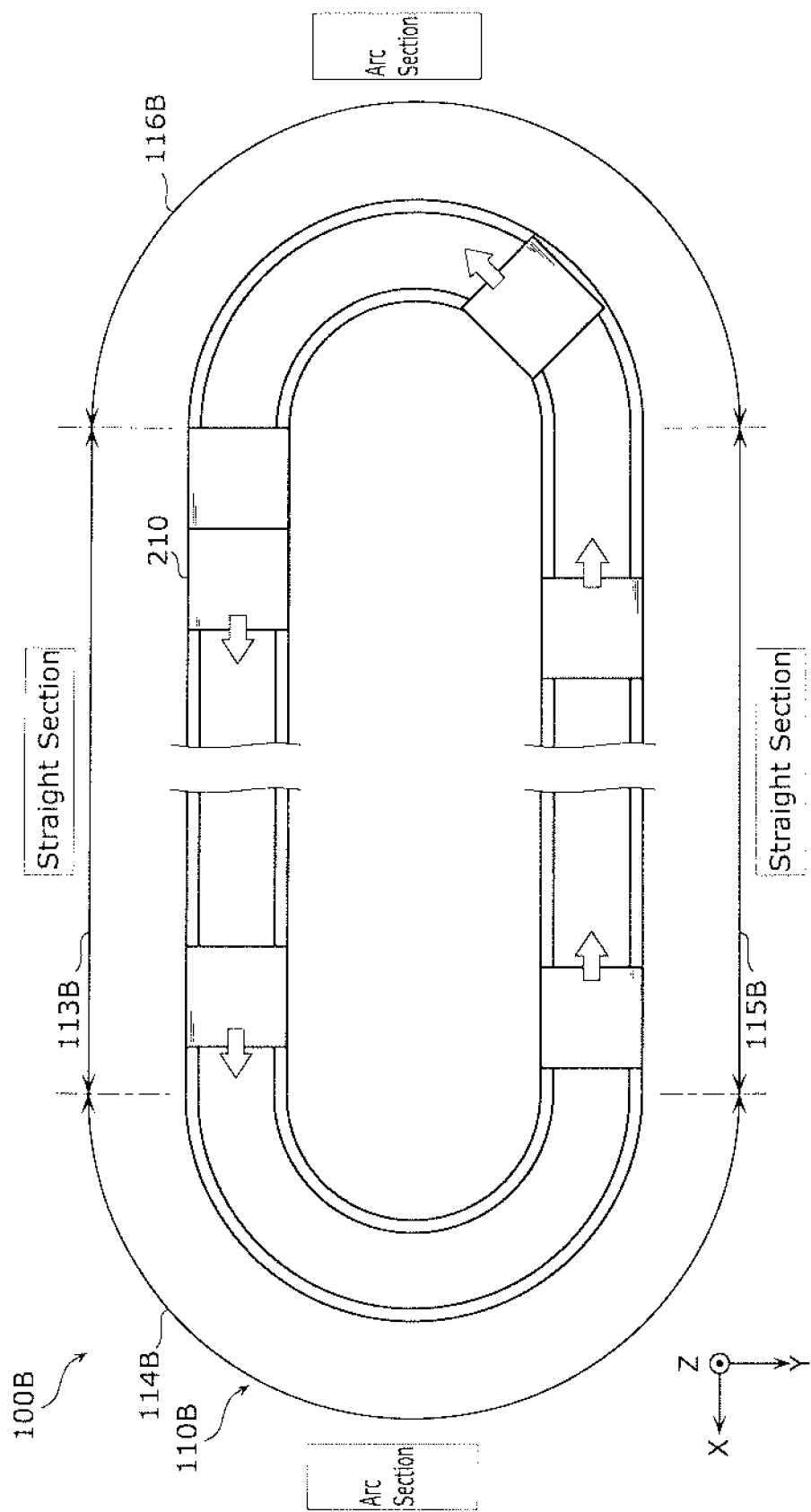
FIG. 7 is a schematic diagram explaining a configuration of an article transferring device according to Variant 1 of Example 2.

In Example 2 described above, although the traveling rail 110A is supposed to constitute a path having an elliptic-shape as seen from the horizontal direction, this is not limiting. For an article transferring device 100B of this variant, for example, as shown in FIG. 7, a traveling rail 110B may be adopted that constitutes a path having an elliptic shape as seen from the vertical direction. That is, the traveling rail 110B includes a pair of straight sections 113B, 115B and a pair of arc sections 114B, 116B that constitute an annular path in a plan view. The pair of straight sections 113B, 115B is constituted of, for example, traveling rails facing each other in the horizontal direction. Further, the arc sections 114B, 116B are constituted of traveling rails that respectively connect both ends of the straight sections 113B, 115B. It is not necessary that the entire traveling rail 110B is disposed at the same height, and it may have a section inclined with respect to the horizontal direction.

In this variant, although not shown, the primary-side stators 120 may be disposed over all the sections of the traveling rail 110B. Moreover, the primary-side stators 120 may be disposed only in the pair of straight sections 113B, 115B, and in this variant, in the pair of arc sections 114B, 116B, the first transporting carriage 210 or the second transporting carriage 220 may be caused to move by the rotation mechanism driven by the driving unit. Moreover, the primary-side stators 120 may be disposed in a part of the pair of straight sections 113B, 115B, or a part of the pair of arc sections 114B, 116B. In FIG. 7, although the first transporting carriage 210 or the second transporting carriage 220 is configured to be moved in the counterclockwise direction, it may also be configured to be moved in the clockwise direction.

Variant 2 of Example 2

Figure 8:
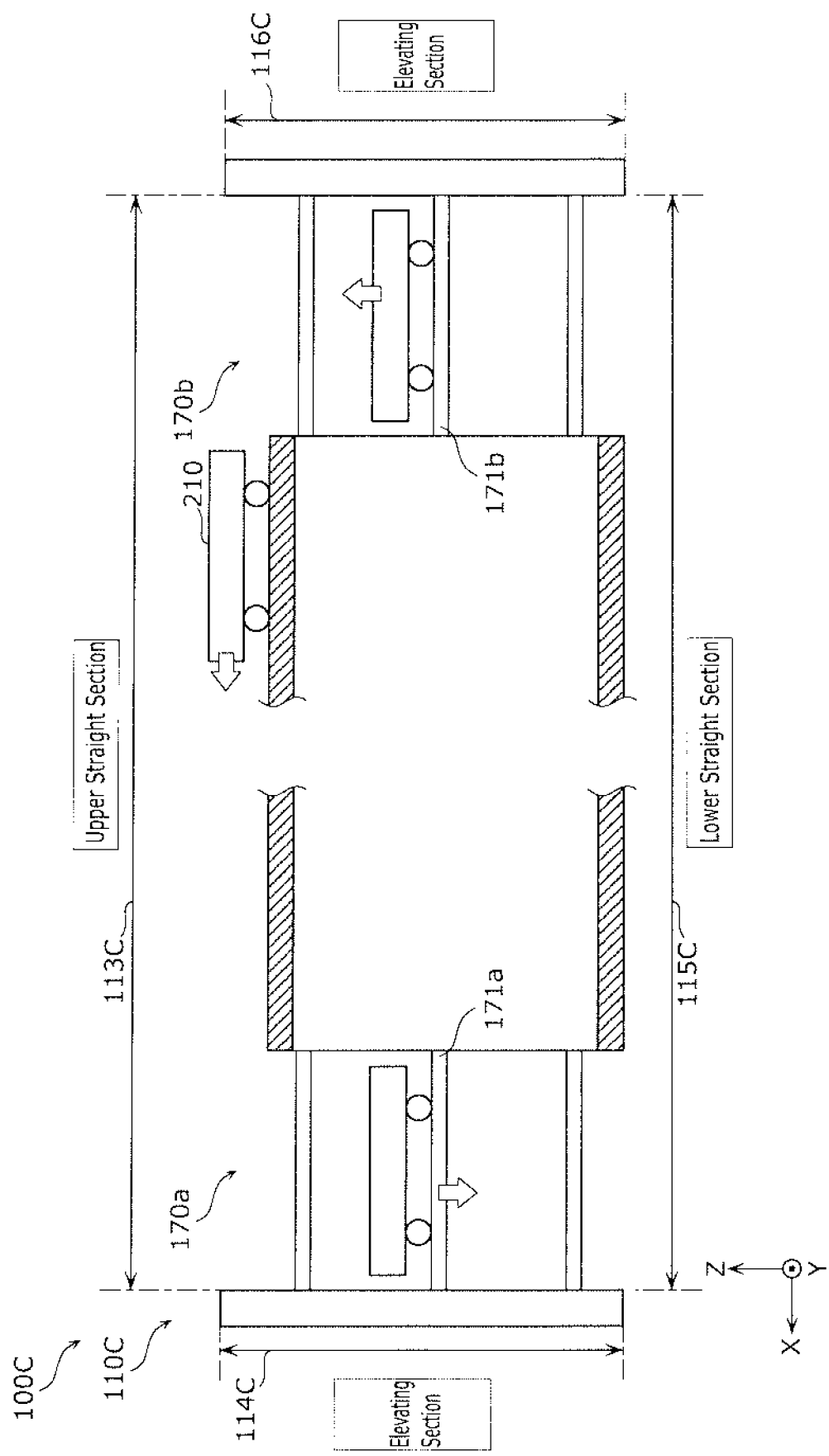
FIG. 8 is a schematic diagram explaining a configuration of an article transferring device according to Variant 2 of Example 2.

Although, in Example 2 described above, the traveling rail 110A constitutes a path having an elliptic shape, the traveling rail will not be limited to this, and may be any one provided that it constitutes an endless path. Specifically, the traveling rail may be constituted of straight sections in a vertical direction in place of the arc sections 114, 116 in Example 2. For an article transferring device 100C of this variant, for example, as shown in FIG. 8, a traveling rail 110C may be adopted that constitutes a path having a rectangular shape as seen from the horizontal direction. That is, the traveling rail 110C includes a pair of straight sections 113C, 115C facing each other in the vertical direction, and a pair of elevating sections 114C, 116C extending in the vertical direction. The pair of elevating sections 114C, 116C is constituted of vertical conveyors 170a, 170b.

The vertical conveyors 170a, 170b are respectively constituted of a first vertical conveyor 170a and a second vertical conveyor 170b. The first vertical conveyor 170a is a conveyor that causes the first transporting carriage 210 disposed in the elevating section 114C to descend. The second vertical conveyor 170b is a conveyor that causes the first transporting carriage 210 disposed in the elevating section 116C to ascend. The first vertical conveyor 170a and the second vertical conveyor 170b are driven synchronously with each other.

The pair of straight sections 113C, 115C is constituted of traveling rails disposed on a straight line, and plural stages of transporting rails 171a, 171b included in the vertical conveyors 170a, 170b. In this variant, although not shown, the primary-side stators 120 may be disposed over the pair of straight sections 113C, 115C of the traveling rail 110C, or disposed in a part of the pair of straight sections 113C, 115C.

The elevating section 114C, 116C may be constituted of a lifter.

Variant 3 of Example 2

Figure 9:
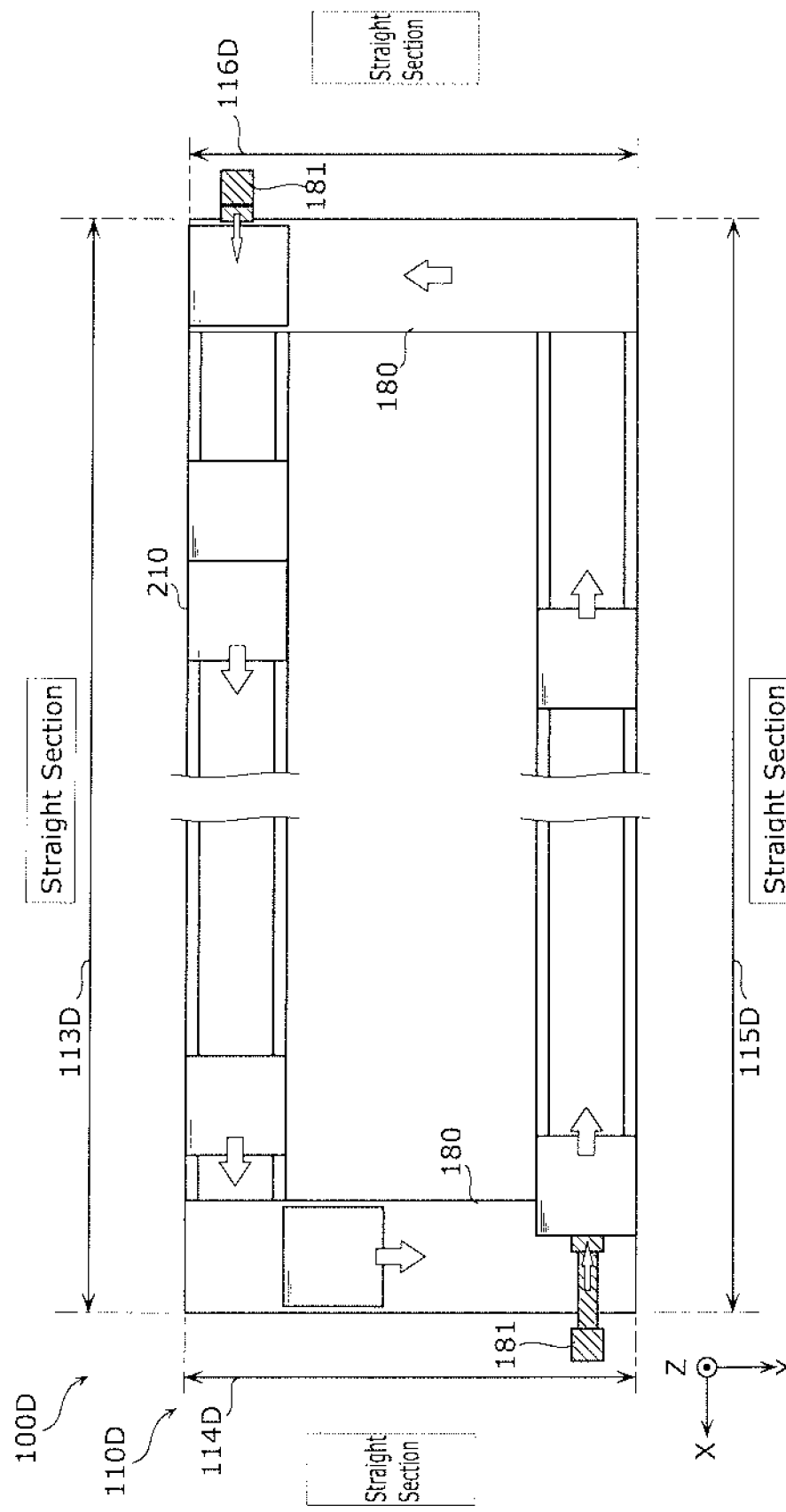
FIG. 9 is a schematic diagram explaining a configuration of an article transferring device according to Variant 3 of Example 2.

In Variant 1 of Example 2 described above, although the traveling rail 110B constitutes a path having an elliptic shape, the traveling rail will not be limited to this provided that it constitutes an endless path. Specifically, the traveling rail may be constituted of straight sections in the horizontal direction in place of the arc sections 114B, 116B in Variant 1 of Example 2. For an article transferring device 100D of this variant, for example, as shown in FIG. 9, a traveling rail 110D may be adopted that constitutes a path having a rectangular shape as seen from the vertical direction. The traveling rail 110D includes four straight sections 113D to 116D constituting a rectangular section.

Among the four straight sections 113D to 116D, the pair of straight sections 113D, 115D facing each other is constituted of straight rails in which the primary-side stators 120 are disposed, and the pair of straight sections 114D, 116D are constituted of conveyors 180 connecting both ends of the pair of straight sections 113D, 115D. The first transporting carriage 210 and the second transporting carriage 220 travel on the rail by receiving magnetic action from the primary-side stators 120, in the pair of straight sections 113D, 115D, until reaching the conveyor 180. Then, the first transporting carriage 210 and the second transporting carriage 220 are transported in a direction perpendicular to the pair of straight sections 113D, 115D by the conveyor 180. That is, the first transporting carriage 210 and the second transporting carriage 220 are transported by the conveyor 180 from one straight section of the pair of straight sections 113D, 115D to the other straight section. Then, the first transporting carriage 210 and the second transporting carriage 220 are pushed out toward the other straight section by a pushing mechanism 181 provided at the position of the other straight section, and thereby being moved to the other straight section.

Variant 4 of Example 2

Although, in Example 2 and Variant 2 of Example 2 described above, it is supposed that a pair of straight sections 113, 115 (113C, 115C) face each other in the vertical direction, they do not necessarily face each other in the vertical direction. That is, the pair of straight sections only need to be different in the height at which each of them is disposed.

Variant 5 of Example 2

In Example 2 described above, it is supposed that the traveling rail constitutes an annular path of an elliptic shape, a rectangular shape or the like as an endless path, but the traveling rail may constitute a path having an "8" shape and a θ shape without being limited to the annular path. That is, the traveling rail may constitute a path having an annular path as its part.

EXAMPLE 3

Next, Example 3 will be described.

Figure 10:
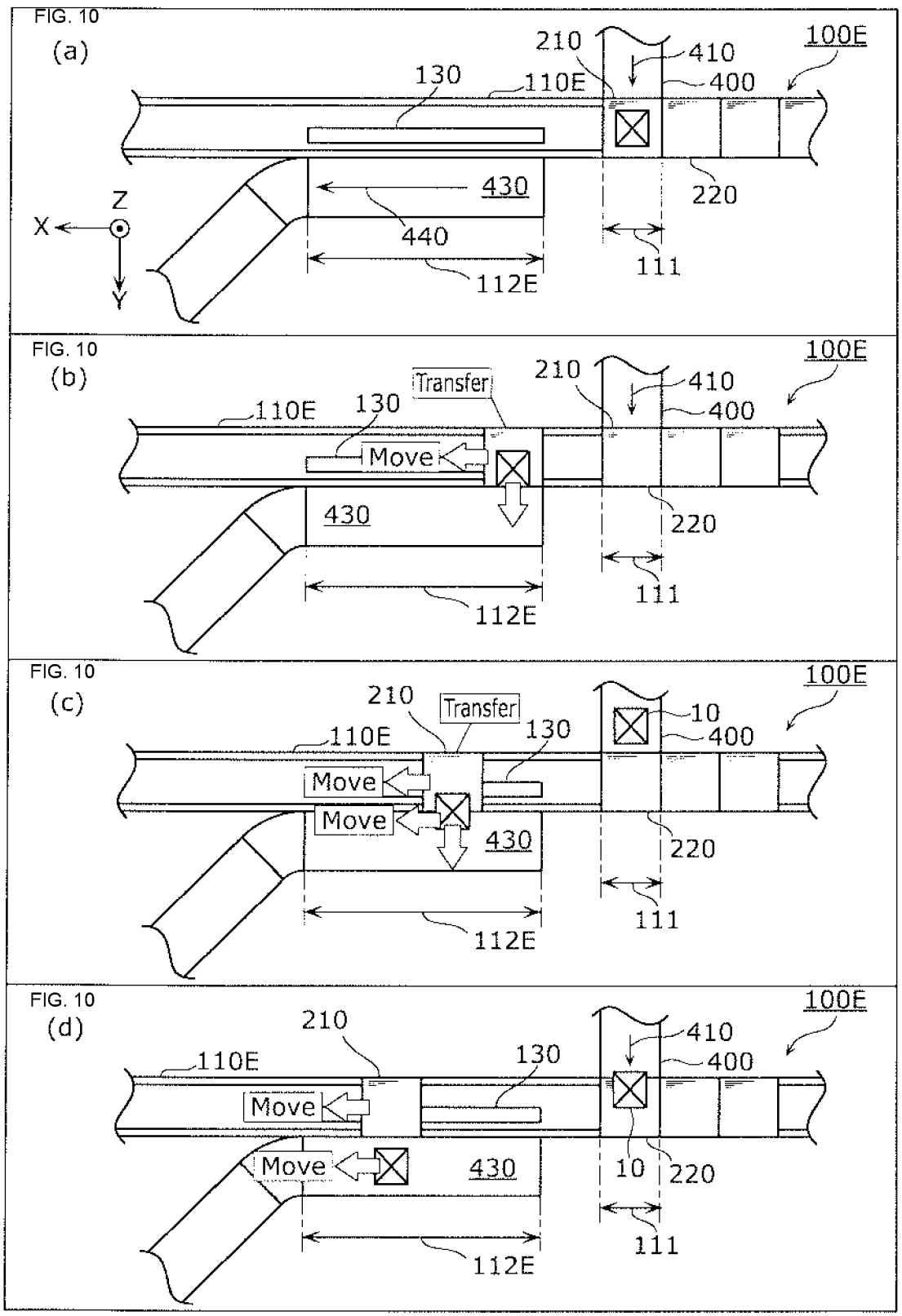
FIGS. 10(a)-10(d) are schematic diagrams explaining a configuration of an article transferring device according to Example 3.

FIG. 10 is a schematic diagram explaining a configuration of an article transferring device according to Example 3.

As shown in FIG. 10, in the article transferring device 100E, the traveling rail 110E includes a second transferring section 112E running in parallel with a second transporting path 440 of a second transporting device 430 that transports the article 10, the second transferring section 112E being a section in which the article 10 is transferred to and from the second transporting device 430. The controller 300 causes the transferring unit 212, 222 to transfer the article 10 in a state in which each of the first transporting carriage 210 and the second transporting carriage 220 is caused to travel at a traveling speed synchronously with a transporting speed of the second transporting device 430 in the second transferring section 112E.

For example, as shown in FIG. 10(a), by controlling the primary-side stators 120, the controller 300 causes each transporting carriage 210, 220 to stop in the first transferring section 111.

Next, as shown in FIG. 10(b), the controller 300 causes the first transporting carriage 210 that has received the article 10 to travel and move by controlling the primary-side stators 120, and transfers the article 10 to the second transporting path 440 of the second transporting device 430 disposed outside the traveling rail 110 by controlling the power source 130 according to detection result of the position sensor 140 to drive the transferring unit 212 of the first transporting carriage 210.

At this moment, as shown in FIGS. 10(c) and (d), the controller 300 causes the first transporting carriage 210 to travel at a traveling sped in synchronous with the transporting speed of the article 10 by the second transporting device 430.

Since transferring of the article 10 is performed in a state in which each transporting carriage 210, 220 is caused to travel at a traveling speed synchronously with the transporting speed of the second transporting device 430 that transports articles on the second transporting path 440 running in parallel with the second transferring section 112E, it is possible to sufficiently transfer the article 10 to and from the second transporting device 430.

In Example 3 described above, the second transporting device 430 is a device that receives the article 10 from the article transferring device 100E, and may be a device that delivers the article 10 to the article transferring device 100E. In this example, since the article transferring device 100E can receive the article 10 from the second transporting device 430 without causing each transporting carriage 210, 220 to stop, it is possible to transfer the article 10 more efficiently.

EXAMPLE 4

Next, Example 4 will be described.

Figure 11:
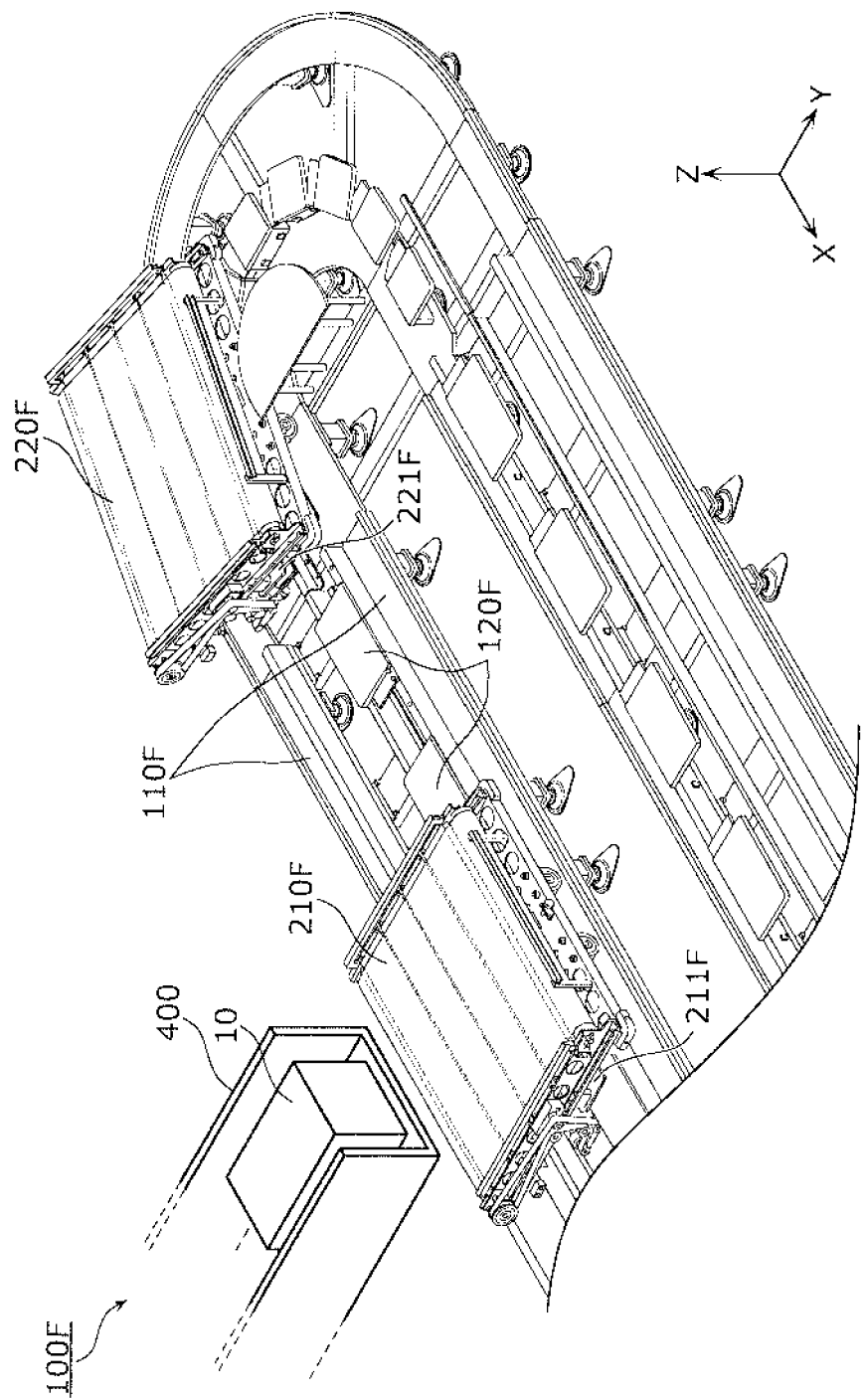
FIG. 11 is a perspective diagram explaining a configuration of an article transferring device in Example 4.
Figure 12:
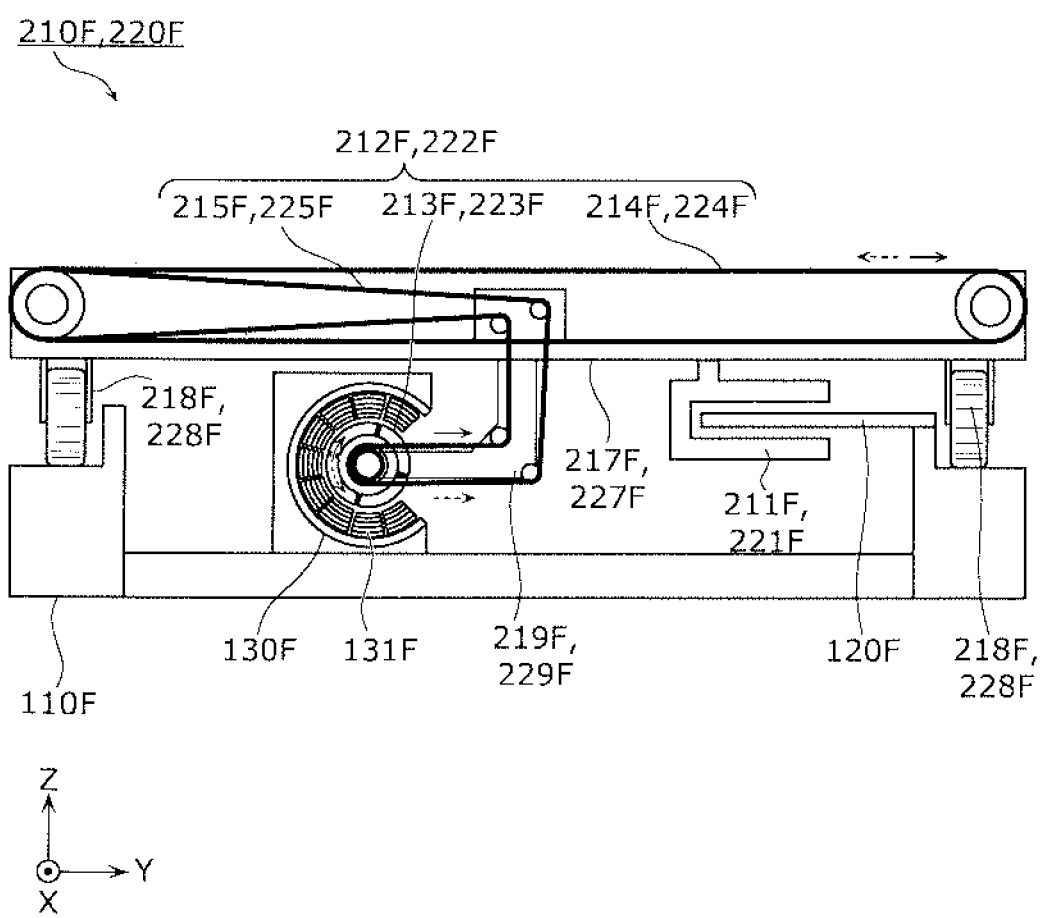
FIG. 12 is a schematic diagram of the article transferring device in Example 4 seen from a traveling direction of a transporting carriage.

FIG. 11 is a perspective diagram explaining a configuration of an article transferring device in Example 4. FIG. 12 is a schematic diagram of the article transferring device in Example 4 seen from the traveling direction of a transporting carriage.

As shown in FIGS. 11 and 12, an article transferring device 100F includes a traveling rail 110F, primary-side stators 120F, a first transporting carriage 210F, and a second transporting carriage 220F.

The article transferring device 100F differs in the configurations of the primary-side stators 120F and the secondary-side movable element 211F compared to the article transferring device 100 in Example 1. Specifically, each of the primary-side stators 120F is different in that it has a shape extending in the horizontal direction (Y-axis direction) (that is, a shape in parallel with the X-Y plane) compared to each of the primary-side stators 120 having a shape extending in the vertical direction (Z-axis direction) (that is, a shape in parallel with the X-Z plane). The secondary-side movable element 211F has a shape along the horizontal direction so that it faces each of the primary-side stators 120F extending in the horizontal direction.

Moreover, the article transferring device 100F is different in the configurations of a power source 130F and a transferring unit 212F compared to the article transferring device 100 in Example 1. Specifically, a primary-side stator 131F has a shape surrounding a range of about 270 degrees around the traveling direction (X-axis direction) of the first transporting carriage 210F. In other words, the primary-side stator 131F has a shape in which a part of the side surface corresponding to a range of about 90 degrees is removed from the side surface of a cylindrical shape. The primary-side stator 131F is disposed such that the removed shape of the cylindrical shape is oriented toward the positive direction of the Y-axis direction.

For this reason, a secondary-side rotator 213F included in the first transporting carriage 210F is provided at a tip end of a supporting member 219F extending toward a negative direction in the Z-axis direction of the frame 217F and extending from an end portion on the negative direction in the Z-axis direction toward a negative direction in the Y-axis direction. The supporting member 219F has an L-shape as seen from the X-axis direction.

Moreover, a belt 215F is disposed in an annular shape as seen from the X-axis direction to extend along the positions of the frame 217F and the supporting member 219F included in the first transporting carriage 210F. The annular shape of the belt 215F is formed by winding the belt 215F on a plurality of pulleys provided on the end surfaces in the X-axis direction of the frame 217F and the supporting member 219F. Therefore, it is possible to decrease a dead space caused by the disposition of the belt 215F. Moreover, since the belt 215F passes through the frame 217F substantially vertically, it is possible to decrease the size of an opening to pass through the frame 217F. Therefore, it is possible to inhibit foreign substances entering inside of the frame 217F.

Further, as with the first transporting carriage 210 of Example 1, the first transporting carriage 210F includes traveling rollers 218F provided on the frame 217F.

The second transporting carriage 220F includes a secondary-side movable element 221F, a transferring unit 222F, a frame 227F serving as a base, and traveling rollers 228F provided on the frame 227.

The secondary-side movable element 221F has the same configuration as that of the secondary-side movable element 211F.

The transferring unit 222F has the same configuration as that of the transferring unit 212F. That is, the secondary-side rotator 223F, the transferring conveyor 224F, and the belt 225F included in the transferring unit 222F respectively have the same configurations as those of the secondary-side rotator 213F, the transferring conveyor 214F, and the belt 215F.

Moreover, the frame 227F and the roller 228F have the same configurations as those of the frame 217F and the roller 218F.

OTHER EXAMPLES

Although, in Examples 1 to 3 described above, the configuration has assumed one-way traveling in which the first transporting carriage 210 and the second transporting carriage 220 travel only in one direction, this is not limiting and the configuration can assume two-way traveling in at least some sections.

Moreover, for example, like an article transferring device 100G shown in FIG. 13, configuration may be made to include a traveling rail 110G that allows the first transporting carriage 210 and the second transporting carriage 220 to travel on a straight path in both directions. In this example, although not shown, the primary-side stators 120 may be disposed over all sections of the traveling rail 110G, or may be disposed over some sections thereof.

Although specific description is not provided in any of above-described Examples 1 to 3 and the above-described other examples, the article transferring device may further include a transporting conveyor disposed to be aligned in a direction of the predetermined path with the traveling rails 110, 110A to 110G in which the primary-side stators 120 are disposed in the predetermined path, and the transporting conveyor transports the first transporting carriage 210 and the second transporting carriage 220. That is, the predetermined path on which the first transporting carriage 210 and the second transporting carriage 220 travel may be constituted of traveling rails and a transporting conveyor disposed between the traveling rails.

Therefore, in a section in which there is no need of changing the traveling speed separately for each of the first transporting carriage 210 and the second transporting carriage 220, it is possible to move them on the predetermined path at a constant speed by the transporting conveyor. That is, it is possible to simplify configuration of a section in which traveling speed does not need to be changed separately.

Moreover, in this example, for example, the traveling rail may include straight sections and arc sections constituting an endless path in a plan view. In this example, the transporting conveyor may be disposed along the arc section.

Furthermore, in this example, for example, the traveling rail on which the primary-side stators 120 are provided, and the transporting conveyor may be disposed to align in a direction in which the straight section extends, in the straight section.

Further, although, in Examples 1 to 3 described above, the transferring unit 212, 222 included in each transporting carriage 210, 220 is driven by magnetic action of the secondary-side rotator 213, 223 by using the primary-side stator 131 included in the power source 130, the configuration may be such that the transferring unit 212, 222 is not driven by magnetic action. For example, the transferring unit may be one driven by being rotated by directly receiving rotational power from a rotating body disposed on the path while each transporting carriage travels.

Although our article transferring devices have been described based on the above examples, this disclosure is not limited to the examples. Those skilled in the art will be readily appreciated that various modifications and combinations of the structural elements in the different examples and variations are possible without materially departing from the novel teachings and advantages of this disclosure. Accordingly, all such modifications and combinations are intended to be included within the scope of the appended claims.

INDUSTRIAL APPLICABILITY

Our article transferring devices are capable of transporting articles onto a predetermined path, and are usable as a holding device and the like that can transfer articles satisfactorily and efficiently to and from another device and location at the side of the predetermined path.

The invention claimed is:

1. An article transferring device that transfers articles, the article transferring device comprising:
    a traveling rail disposed along a predetermined path;
    primary-side stators disposed along the predetermined path;
    a first transporting carriage and a second transporting carriage each of which includes a secondary-side movable element and transports an article by traveling on the traveling rail by the secondary-side movable element receiving a magnetic action from the primary-side stators;
    a power source disposed on the predetermined path; and
    a controller that controls operation of a ground primary-side linear motor system, the ground primary-side linear motor system including the primary-side stators and the secondary-side movable element,
    wherein each of the first transporting carriage and the second transporting carriage is caused to travel to be stopped or change a traveling speed individually by the ground primary-side linear motor system, and
    further includes a transferring unit that transfers the article in an intersecting direction intersecting with the predetermined path by receiving force from the power source,
    wherein the traveling rail includes a transferring section running in parallel with a transporting path of a second transporting device that transports the article, the transferring section being a section in which the article is transferred to and from the second transporting device, and
    wherein the controller causes the transferring unit to transfer the article in a state in which each of the first transporting carriage and the second transporting carriage is caused to travel at a traveling speed synchronously with a transporting speed of the second transporting device in the second transferring section.

2. The article transferring device according to claim 1, wherein the controller causes one of the first transporting carriage and the second transporting carriage to move while causing another of the first transporting carriage and the second transporting carriage to stop.

3. The article transferring device according to claim 2, wherein
    the traveling rail includes a first transferring section arranged along a direction intersecting with a direction of arranging a first transporting path of a first transporting device that transports the article, the first transferring section being a section in which the article is transferred to and from the first transporting device, and the controller causes the transferring unit to transfer the article to and from the first transporting device in a state in which each of the first transporting carriage and the second transporting carriage is stopped in the first transferring section.

4. The article transferring device according to claim 2, wherein the controller causes the first transporting carriage and the second transporting carriage to travel in synchronous with each other.

5. The article transferring device according to claim 1, wherein the transferring unit includes:
a secondary-side rotator that rotates by a rotary shaft extending in a traveling direction of the first transporting carriage or the second transporting carriage; and
a transferring conveyor driven in the intersecting direction by the secondary-side rotator,
the power source comprises the primary-side stators each having a substantially C-shaped cross section, the primary-side stators covering a part of a region where the secondary-side rotator included in each of the first transporting carriage and the second transporting carriage passes when each of the first transporting carriage and the second transporting carriage travels, and
the secondary-side rotator is rotated by receiving magnetic force due to a magnetic action from the primary-side stator of the power source to drive the transferring conveyor.

6. The article transferring device according to claim 1, wherein
the traveling rail includes an endless path having a straight section and an arc section, and
the article transferring device further comprises:
a rotation mechanism rotated to cause one of the first transporting carriage and the second transporting carriage to move on the arc section; and
a motor that rotates the rotation mechanism.

7. The article transferring device according to claim 6, wherein
the endless path of the traveling rail includes a pair of straight sections facing each other in a vertical direction, the pair of straight sections including an upper straight section and a lower straight section, and
each of the first transporting carriage and the second transporting carriage is caused to travel in the arc section by gravity to each of the first transporting carriage and the second transporting carriage, the arc section being connected from the upper straight section to the lower straight section.

8. The article transferring device according to claim 7, wherein the controller that controls operation of the ground primary-side linear motor system causes the first transporting carriage or the second transporting carriage to decelerate by controlling the primary-side stators disposed in the lower straight section.

9. The article transferring device according to claim 8, wherein the controller causes the first transporting carriage and the second transporting carriage to stay in the lower straight section.

10. The article transferring device according to claim 9, wherein the primary-side stators disposed in the upper straight section are arranged more densely than the primary-side stators disposed in the lower straight section.

11. The article transferring device according to claim 1, further comprising:
a transporting conveyor aligned in a direction of the predetermined path with the traveling rail in which the primary-side stators are disposed in the predetermined path, the transporting conveyor transporting the first transporting carriage and the second transporting carriage.

12. The article transferring device according to claim 11, wherein
the predetermined path is an endless path having a straight section and an arc section in a plan view, and
the transporting conveyor is disposed along the arc section.

13. The article transferring device according to claim 11, wherein
the predetermined path is an endless path having a straight section and an arc section in a plan view, and
the traveling rail and the transporting conveyor are aligned in the straight section in a direction in which the straight section extends, the primary-side stators being disposed along the traveling rail.

14. An article transferring device that transfers articles, comprising:
a traveling rail disposed along a predetermined path which is an endless path having a straight section and an arc section;
primary-side stators disposed along the predetermined path;
a first transporting carriage and a second transporting carriage each of which includes a secondary-side movable element and transports an article by traveling on the traveling rail by the secondary-side movable element receiving a magnetic action from the primary-side stators;
a power source disposed on the predetermined path;
a rotation mechanism rotated to move one of the first transporting carriage and the second transporting carriage on the arc section; and
a motor that rotates the rotation mechanism, wherein
each of the first transporting carriage and the second transporting carriage is caused to travel to be stopped or change a traveling speed individually by a ground primary-side linear motor system including the primary-side stators and the secondary-side movable element, and
further includes a transferring unit that transfers the article in an intersecting direction intersecting with the predetermined path by receiving force from the power source.

\* \* \* \* \*